US011287859B2

(12) United States Patent
Veenman et al.

(10) Patent No.: US 11,287,859 B2
(45) Date of Patent: Mar. 29, 2022

(54) REARVIEW ASSEMBLY WITH ENHANCED COOLING

(71) Applicant: GENTEX CORPORATION, Zeeland, MI (US)

(72) Inventors: Steven J. Veenman, Hudsonville, MI (US); Eric S. Sloterbeek, Hudsonville, MI (US); Brian D. Jewell, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/816,975

(22) Filed: Mar. 12, 2020

(65) Prior Publication Data
US 2020/0293099 A1    Sep. 17, 2020

Related U.S. Application Data

(60) Provisional application No. 62/818,887, filed on Mar. 15, 2019.

(51) Int. Cl.
*G06F 1/20*    (2006.01)
*B60R 1/08*    (2006.01)
(Continued)

(52) U.S. Cl.
CPC ............ *G06F 1/20* (2013.01); *B60R 1/08* (2013.01); *B60R 1/12* (2013.01); *H04N 5/2252* (2013.01);
(Continued)

(58) Field of Classification Search
CPC .... G06F 1/20; B60R 1/08; B60R 1/12; B60R 2001/1253; B60R 1/04; H04N 5/2252;
(Continued)

(56) References Cited

U.S. PATENT DOCUMENTS 5,800,040 A     9/1998  Santo
2006/0287821 A1*  12/2006  Lin ........................ B60R 1/12
                                                    701/469
(Continued)

FOREIGN PATENT DOCUMENTS

CN      205256172 U    5/2016
EP        1350284 B1    6/2013

OTHER PUBLICATIONS

International Search Report dated Jul. 2, 2020, for correspondence PCT application No. PCT/US2020/022331, 3 pages.
(Continued)

*Primary Examiner* — James M Pontius
(74) *Attorney, Agent, or Firm* — Price Heneveld LLP; Brian James Brewer

(57) ABSTRACT

A rearview assembly comprises a rearview device; a housing supporting the rearview device; a cavity defined by the housing and the rearview device; a first printed circuit board having a processor and disposed within the cavity; a second printed circuit board in communication with the first printed circuit board and disposed within the cavity; at least one rib having an outer edge and extending from the housing into the cavity; and a channel whose sidewalls are defined by a portion of the housing, the at least one rib, and a portion of the second printed circuit board. An air moving device may draw air through the channel. A seal may be employed to make the sidewalls of the channel generally airtight.

17 Claims, 3 Drawing Sheets

(51) Int. Cl.
*B60R 1/12* (2006.01)
*H04N 5/225* (2006.01)
*H04N 5/907* (2006.01)

(52) U.S. Cl.
CPC ...... *H04N 5/907* (2013.01); *B60R 2001/1253* (2013.01); *B60Y 2306/05* (2013.01)

(58) Field of Classification Search
CPC ........ H04N 5/907; H04N 5/77; H04N 5/2251; B60Y 2306/05
See application file for complete search history.

(56) References Cited

U.S. PATENT DOCUMENTS

| | | | |
|---|---|---|---|
| 2010/0238289 A1* | 9/2010 | Wu | G07C 5/0891 |
| | | | 348/148 |
| 2017/0182943 A1 | 6/2017 | Hoenninger | |
| 2018/0067279 A1* | 3/2018 | Veenman | F21V 29/63 |
| 2020/0081505 A1* | 3/2020 | Ma | H05K 7/20336 |

OTHER PUBLICATIONS

Written Opinion dated Jul. 2, 2020, for correspondence PCT application No. PCT/US2020/022331, 5 pages.

* cited by examiner

REARVIEW ASSEMBLY WITH ENHANCED COOLING

CROSS REFERENCE TO RELATED APPLICATIONS

This application claims the benefit of and priority to U.S. Provisional Patent Application No. 62/818,887, filed on Mar. 15, 2019, entitled Rearview Assembly with Enhanced Cooling, the entire disclosure of which is hereby incorporated herein by reference.

FIELD OF THE DISCLOSURE

This disclosure relates generally to rearview mirror assemblies, and in particular, to rearview mirror assemblies having enhanced cooling capabilities.

SUMMARY

According to some aspects of this disclosure, a rearview assembly may comprise a rearview device; a housing supporting the rearview device; a cavity defined by the housing and the rearview device; a first printed circuit board having a processor and disposed within the cavity; a second printed circuit board having a first surface and a second surface, in communication with the first printed circuit board and disposed within the cavity; at least one rib having an outer edge and extending from the housing into the cavity; and a channel whose sidewalls are defined by a portion of the housing, the at least one rib, and a portion of the second printed circuit board.

The rearview assembly may further comprise an air moving device disposed within the cavity and configured to draw air from an area exterior to the housing into the cavity. The rearview assembly further may comprise a seal extending between the outer edge of the at least one rib and a portion of the second printed circuit board; wherein the seal is capable of rendering the sidewalls of the channel airtight. The rearview assembly further may comprise a seal extending between the second printed circuit board and the first printed circuit board. The rearview assembly further may comprise a seal extending between the second printed circuit board and the air moving device. The outer edge of the at least one rib may contact the second surface of the second printed circuit board. The rearview assembly further may comprise a memory card holder configured to hold a memory card disposed on the first surface of the second printed circuit board. The housing may define at least one vent opening at a first end of and in fluid communication with the channel. The memory card holder may be in proximity to the first end of the channel. The housing may define an opening in communication with the memory card holder and configured to accept a memory card.

According to another aspect, a rearview assembly may comprise a rearview device; a housing supporting the rearview device; a cavity defined by the housing and the rearview device; a first printed circuit board having a processor and disposed within the cavity; a second printed circuit board in communication with the first printed circuit board and disposed within the cavity; a memory card holder disposed on the second printed circuit board; at least one rib having an outer edge and extending from the housing into the cavity; a channel whose sidewalls are defined by a portion of the housing, the at least one rib, and a portion of the second printed circuit board; and an air moving device disposed within the cavity and configured to draw air from an area exterior to the housing into the cavity. The sidewalls of the channel may be generally airtight.

The rearview assembly further may comprise a seal; wherein the seal may be disposed between the outer edge of the at least one rib and the second printed circuit board. The rearview assembly further may comprise a seal; wherein the seal may be disposed between the second printed circuit board and the first printed circuit board. The rearview assembly further may comprise a seal; wherein the seal may be disposed between the second printed circuit board and the air moving device. The processor may be in communication with at least one imaging device. The processor may be in communication with at least two imaging devices. The housing may define at least one vent opening; the at least one vent opening may be at one end of and in fluid communication with the channel; and the memory card holder may be in proximity to the vent opening. The housing further may define a memory card opening configured to accept a memory card and in communication with memory card holder.

According to another aspect, a rearview assembly may comprise a rearview device; a housing supporting the rearview device; a cavity defined by the housing and the rearview device; a first printed circuit board having a processor and disposed within the cavity; a second printed circuit board in communication with the first printed circuit board and disposed within the cavity; a memory card holder in communication with the second printed circuit board; at least one rib having an outer edge and extending from the housing into the cavity; a channel whose sidewalls are defined by a portion of the housing, the at least one rib, and a portion of the second printed circuit board; an air moving device disposed within the cavity and configured to draw air from an area exterior to the housing into the cavity; and a seal disposed between the air moving device and the second printed circuit board; wherein the processor is in communication with at least two imaging devices. The at least a portion of the outer edge of the at least one rib is in contact with the second printed circuit board. The rearview assembly may further comprise a vent opening defined by the housing and disposed at one end of the channel. The vent opening may be configured so that, when air is drawn from an area exterior to the housing into the cavity, the air enters through the vent opening and travels through at least a portion of the channel.

DETAILED DESCRIPTION

In accordance with this disclosure, a rearview assembly may comprise an enhanced cooling system to allow for the addition of image storage and other capabilities without causing overheating of components of the rearview assembly.

Figure 1:
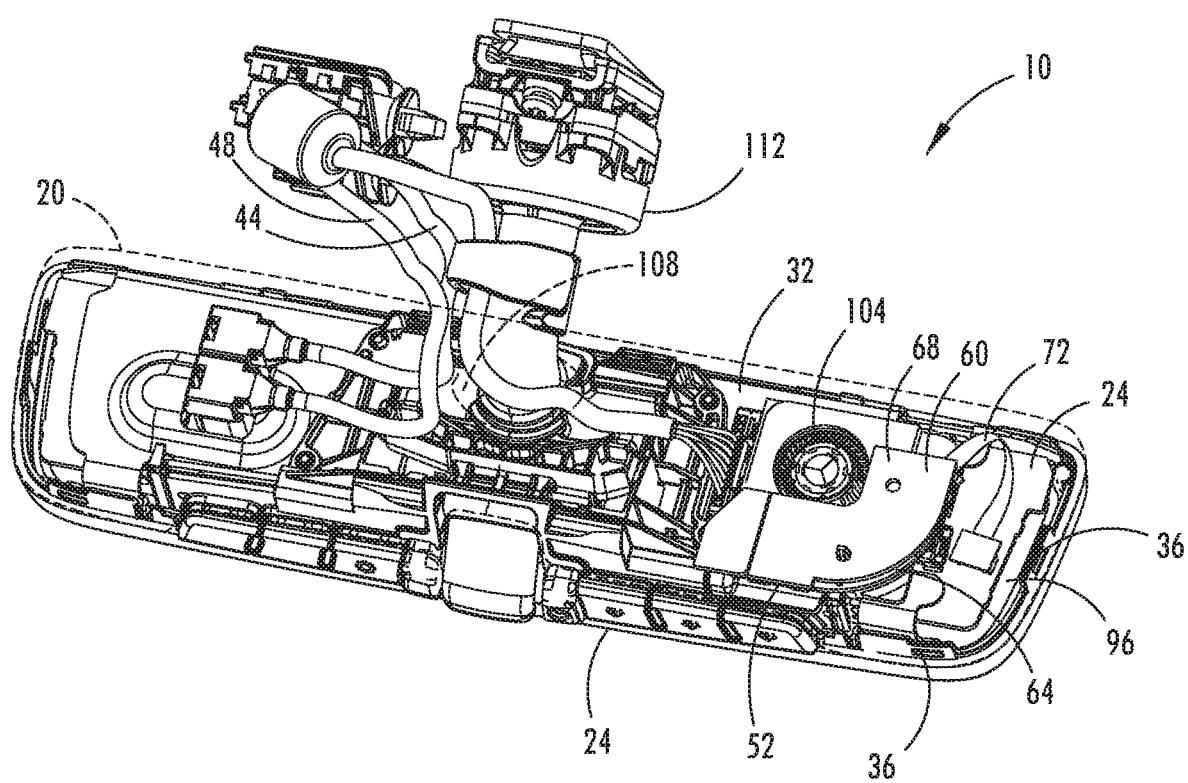
FIG. 1 illustrates a perspective view of a partially cutaway rear portion of a rearview assembly in accordance with this disclosure.

Referring to FIG. 1, the rearview assembly, generally indicated at 10, may comprise a housing 20, a rearview device 24, and a first printed circuit board 28 having a processor (not shown). The rearview device 24 may comprise at least one of a light source such as a light emitting diode, a mirror element, and an electro-optic device. Housing 20 may support rearview device 24, and a cavity 32 may be defined by housing 20 and rearview device 24. First printed circuit board 28 may be disposed within cavity 32. Rearview device 24 may further comprise connecting elements 36 configured to mate with opposite connecting elements (not shown) on housing 20, wherein the connecting elements 36 allow rearview device 24 to be connected to housing 20.

In some embodiments, the processor may be in communication with and configured to receive inputs from a plurality of cameras or imaging devices. In some embodiments, rearview assemblies in vehicles may be capable of capturing, displaying, and storing images of a scene to the rear of the vehicle, wherein the images may be collected from a first camera or other imaging device (not shown). Rearview assemblies may also be capable of capturing and storing images collected from a second camera or other imaging device. In some embodiments, second camera or other imaging device may be configured to capture images of a scene to the front of the vehicle. In some embodiments, second camera or other imaging device may be configured to capture images of a scene of the interior of the vehicle.

First printed circuit board 28 of rearview assembly 10 may be in communication with the first camera or other imaging device via inputs received through a first wiring harness or flex harness 44. First printed circuit board 28 may further be in communication with rearview device 24. The processor of first printed circuit board 28 may be configured to process image data captured by first imaging device. Image data may be processed to enable captured images to be displayed on rearview device 24. In some embodiments, the processor may be a high-speed processor. The processor may generate high thermal loads when the rearview assembly 10 is used in the full display mirror mode, in which images displayed on the rearview element are captured by a rear-facing camera or other imager.

First printed circuit board 28 may also be in communication with the second camera or other imaging device (not shown), and may receive inputs via a second wiring harness or flex harness 48 in communication with second imaging device. Processor may be configured to process the image data from images captured by second imaging device. As shown, rearview assembly 10 is configured to receive inputs from two cameras or imaging devices, but more or fewer cameras or imaging devices may be used and still be within the contemplated scope of this disclosure. For example, a third imaging device (not shown) may be disposed to capture image data for a scene exterior to a passenger side of the vehicle. The third imaging device may be in communication with the processor, and the processor may be configured to process the image data received from the third imaging device. Continuing the example, a fourth imaging device may be disposed to capture image data from a scene exterior to a driver side of the vehicle. The fourth imaging device may be in communication with the processor, and the processor may be configured to process image data received from fourth imaging device.

Figure 2:
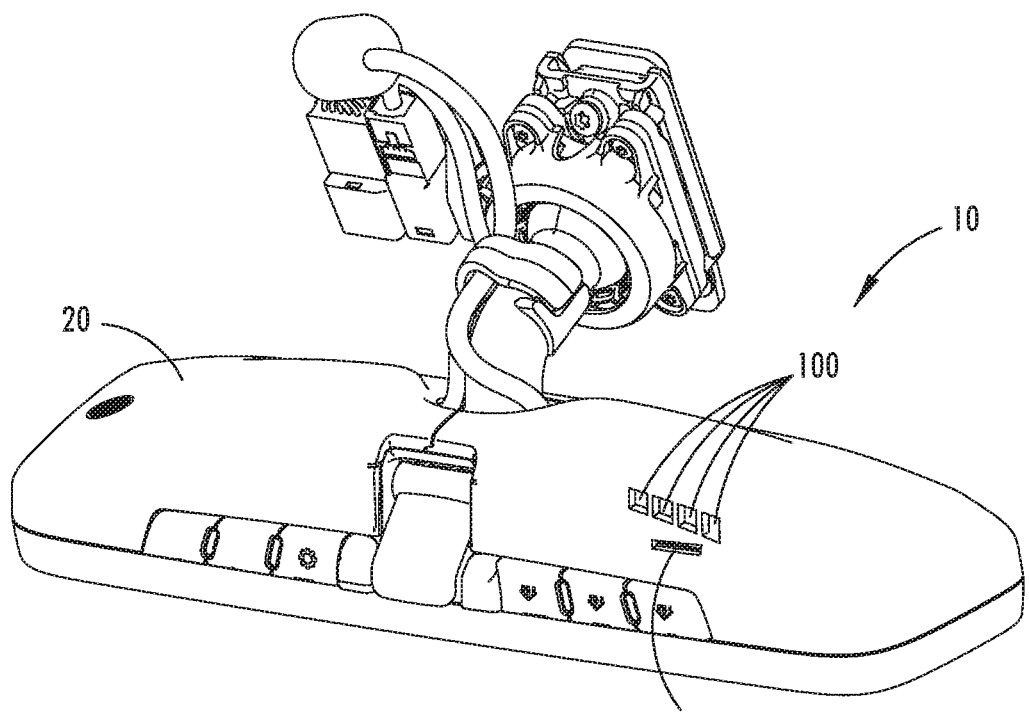
FIG. 2 illustrates a perspective view of a rearview assembly.

Rearview assembly 10 may comprise a memory card holder 52 and may be configured to allow a memory card to store image data from images captured by at least one of first and second imaging devices. Memory card holder 52 may be configured to accept a memory card, and may be in communication with at least one printed circuit board of rearview assembly 10. Housing 20 may define a memory card opening 56, as shown in FIG. 2, in communication with memory card holder 52 and configured to allow memory card to be inserted therethrough.

Rearview assembly 10 may be configured to use a high-capacity memory card (not shown). The high-capacity memory may include a high-capacity flash memory card such as a Secure Digital (SD) card or a micro-SD card, although rearview assembly 10 may be configured to use other types of memory cards and still be within the scope of this disclosure.

In operation, memory card may be used to record image data from scenes captured by at least one of first and second imaging devices. The image data may be processed by the processor of rearview assembly 10, thereby allowing rearview assembly 10 to selectively function as a digital video recorder, storing image data from images captured by the one or more imaging devices. However, using a memory card in a rearview assembly 10, especially a rearview assembly 10 having full display mirror capabilities, may increase power consumption of the rearview assembly 10 by about thirty percent or more. The additional power consumption results from the power demands of the memory card itself and the additional video processing required to process image data from captured images to be stored on the memory card. Using the memory card may increase thermal loading in the rearview assembly 10 to the point at which the memory card or other components may become susceptible to damage or failure.

In some embodiments, inputs from an additional camera or imaging device may be added to the rearview assembly 10, and the additional image data to be processed may also increase the power requirements of the rearview assembly 10. Increased power consumption may be accompanied by increased heat generation within the rearview assembly 10. However, memory cards have an upper temperature limit at which they can operate, generally no higher than 85 degrees C. Furthermore, it may be desirable to limit temperatures within rearview assembly 10 to prevent housing 20 of rearview assembly 10 from becoming uncomfortably hot for users who may need to adjust or otherwise handle rearview assembly 10. Therefore, it may be desirable to limit temperatures within rearview assembly 10, and to limit the temperatures of any processors and/or printed circuit boards and other heat-generating components that may be within rearview assembly 10.

In some embodiments, rearview assembly 10 components may be arranged to minimize temperatures. For example, in some embodiments, rearview assembly 10 may further comprise a second printed circuit board 60. Second printed circuit board 60 may have a first surface 64 and an opposed second surface 68. Memory card holder 52 may be disposed on first surface 64 of second printed circuit board 60. Memory card holder 52 and second printed circuit board 60 may be in communication with first printed circuit board 28. In some embodiments, first printed circuit board 28 may be connected to second printed circuit board through a harness or wiring 72. In some embodiments, first printed circuit board 28 may be connected to second printed circuit board 60 via board-to-board connection (not shown).

During operation, the memory card may generate significant heat. Disposing memory card holder 52 on second printed circuit board 60 rather than on first printed circuit board 28 may reduce or eliminate temperature increases on first printed circuit board 28 due to memory card during operation. However, it may be desirable to dissipate the heat that may be generated by memory card on second printed circuit board 60 to ensure that memory card and other components of rearview assembly 10 that may be sensitive to high temperatures do not fail.

Figure 3A:
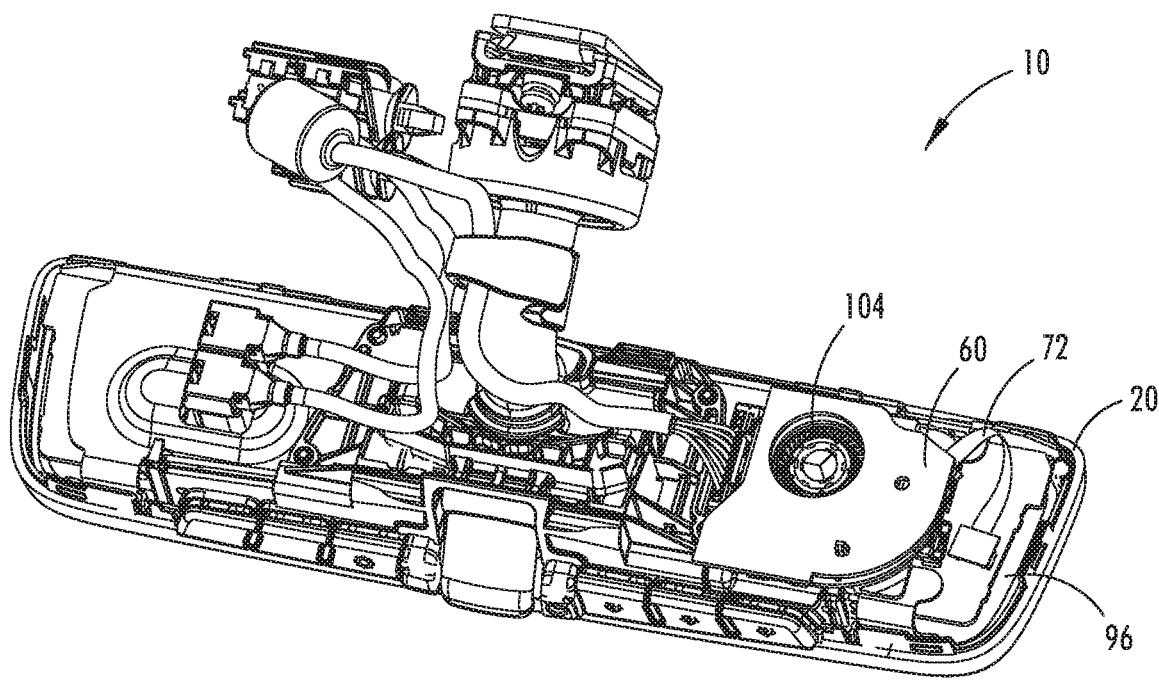
FIG. 3A illustrates a perspective view of a partially cut-away rear portion of a rearview assembly.
Figure 3B:
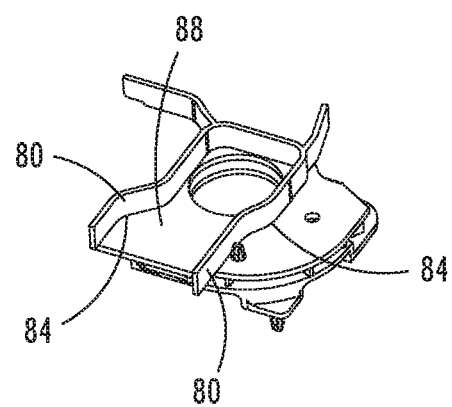
FIG. 3B illustrates a portion of the rearview assembly showing the at least one rib of the housing.

Referring to FIG. 3B, housing 20 may comprise at least one rib 80 extending into cavity 32. The at least one rib 80 may have an outer edge 84 extending along at least a portion of its length. A sidewall portion of a channel 88 may be defined by at least a portion of the at least one rib 80, a portion of housing 20, and a portion of second printed circuit board 60. Housing 20 may define at least one vent opening 100. The at least one vent opening 100 may be disposed at a first end of and in fluid communication with channel 88. Memory card holder 52 may be disposed on first surface 64 of second printed circuit board 64 at a location near the at least one vent opening 100.

In some embodiments, outer edge 84 of the at least one rib 80 may be disposed against second surface 68 of second printed circuit board 60. Channel 88 may extend from the at least one vent opening 100, across at least a portion of second surface 68 of second printed circuit board 60. The sidewall portion of channel 88 may comprise a portion of housing 20, the at least one rib 80, and second printed circuit board 60. Thus, the portion of second printed circuit board 60 that may be in contact with memory card holder 52 may be exposed to incoming air shortly after the air enters cavity 32 and before the air has been exposed to other components of rearview assembly 10 and therefore started to warm up.

The sidewall portion of channel 88 may be generally airtight to allow maximum airflow through channel 88 and across second surface 68 of second printed circuit board 60, thereby providing maximum cooling to second printed circuit board 60. After passing over second printed circuit board 60, air may be directed to the rest of cavity 32, where it may be used to cool other components of rearview assembly 10. Directing incoming air first to second printed circuit board 60 may result in having the coolest air directed past second printed circuit board 60 to cool it.

Figure 4:
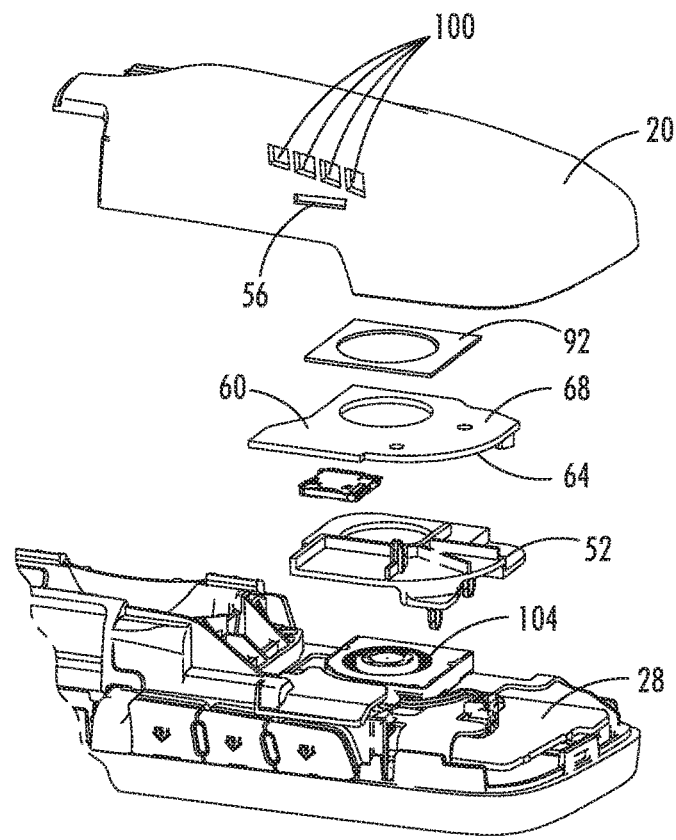
FIG. 4 illustrates an exploded view of one configuration of a portion of the rearview assembly.
Figure 5:
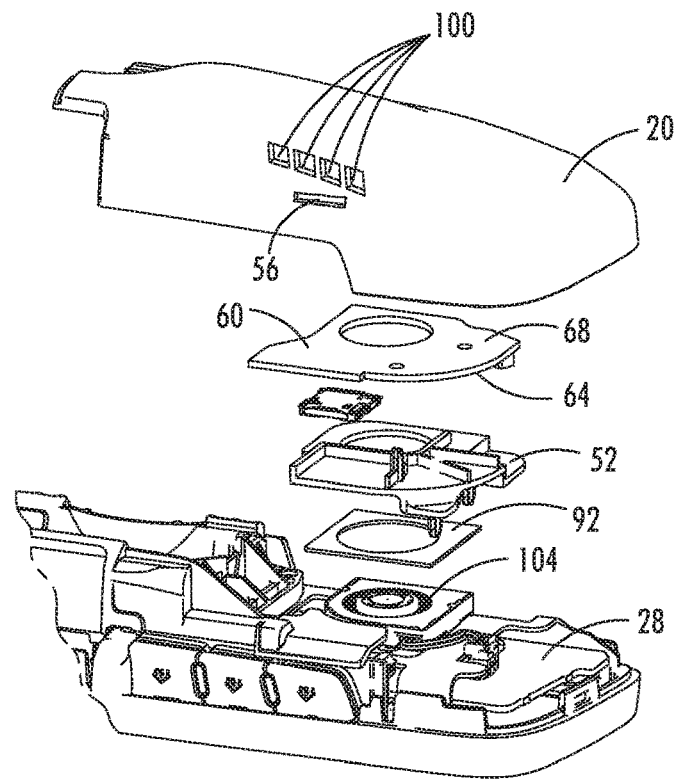
FIG. 5 illustrates an exploded view of a second configuration of a portion of a rearview assembly.

As shown in FIGS. 4 and 5, in some embodiments, a seal 92 may be disposed to make the sidewall portion of channel 88 generally airtight. Seal 92 may comprise a soft material such as a neoprene foam, a polyurethane, a polyethylene foam, a polystyrene, a polyester foam, a polyether foam, a silicone foam, a soft rubber, an elastomer, or another suitable material.

In some embodiments, as shown in FIG. 4, seal 92 may be disposed between outer edge 84 of the at least one rib 80 and second printed circuit board 60. In some embodiments, as shown in FIG. 5, seal 92 may be disposed between second printed circuit board 60 and rearview device 24. Seal 92 may be disposed between first and second printed circuit boards 28, 60, between first printed circuit board 28 and a heat sink 96, or another suitable location. Seal 92 may be compressible. Having a compressible seal 92 may allow rearview assembly 10 to more easily be manufactured with the at least one rib 80 contacting second printed circuit board 60, thereby creating a channel 88 having generally airtight sidewalls for air flow. Seal 92 may be configured to, when in the proper position, cause outer edge 84 of the at least one rib 80 to press against second printed circuit board 60, thereby holding second printed circuit board 60 in place against the at least one rib 80 for a generally airtight seal 92, while allowing rearview device 24 to be connected to housing 20 during manufacturing without damaging components, rearview device 24, or housing 20. Disposing seal 92 between first and second printed circuit board 28, 60 may result in isolating second printed circuit board 60 from the heat generated by other components of rearview assembly 10, thereby reducing heat transfer from other components of rearview assembly 10 and limiting the heating of second printed circuit board 60.

In some embodiments, a cooling system may be implemented within rearview assembly 10. An air moving device 104 may be disposed within cavity 32 and in proximity to vent opening 100. In some embodiments, air moving device 104 may be configured to draw ambient air from an area exterior to housing 20 into cavity 32. Air may be drawn into cavity 32 through the at least one vent opening 100. The incoming air may be at a lower temperature than air inside cavity 32.

Air drawn in through the at least one vent opening 100 by air moving device 104 may be drawn over second surface 68 of second printed circuit board 60. Since memory card holder 52 may be disposed on first surface 64 of second printed circuit board 60 and in proximity to the at least one vent opening, the memory card holder may be cooled.

Housing 20 may further comprise an exhaust opening 108. In some embodiments, exhaust opening 108 may be disposed around a mounting element 112 that may be capable of mounting rearview assembly 10 to a vehicle. Additionally or alternatively, air may leave cavity 32 through the joints or seams in rearview assembly 10 as the joints or seams of rearview assembly 10 may not be airtight.

Rearview assembly 10 may be suitable for use inside a vehicle. Rearview assembly 10 may be operably coupled with an inside surface of a windshield, a headliner of the vehicle, a ceiling of the vehicle, operably coupled with a dashboard of the vehicle, or directly coupled with a support structure or frame of the vehicle.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

In this document, relational terms, such as first and second, top and bottom, front and back, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications.

The invention claimed is:

1. A rearview assembly comprising:
 a rearview device;
 a housing supporting the rearview device;
 a cavity defined by the housing and the rearview device;
 a first printed circuit board having a processor and disposed within the cavity;
 a second printed circuit board having a first surface and a second surface opposite the first surface, the second printed circuit board being in communication with the first printed circuit board and disposed within the cavity;

at least one rib having an outer edge and extending from the housing into the cavity;

an air moving device disposed within the cavity;

a memory card holder configured to hold a memory card, the memory card holder disposed on the first surface of the second printed circuit board; and a channel whose sidewalls are defined by a portion of the housing, the at least one rib, and a portion of the second surface of the second printed circuit board opposite the location of the memory card holder;

wherein the channel is configured to allow the memory card holder to be cooled by air moving through the channel on the other side of the second printed circuit board from the memory card holder;

wherein the housing defines at least one vent opening at a first end of and in fluid communication with the channel; and wherein the air moving device is configured to draw air from an area exterior to the housing through the at least one vent opening and into the channel.

2. The rearview assembly of claim 1, further comprising a seal extending between the second printed circuit board and the air moving device.

3. The rearview assembly of claim 1, further comprising a seal extending between the outer edge of the at least one rib and a portion of the second printed circuit board; wherein the seal is capable of rendering the sidewalls of the channel between the outer edge of the at least one rib and the portion of the second printed circuit board airtight.

4. The rearview assembly of claim 1, wherein the outer edge of the at least one rib contacts the second surface of the second printed circuit board.

5. The rearview assembly of claim 1, wherein the memory card holder is in proximity to the first end of the channel.

6. The rearview assembly of claim 1, wherein the housing defines an opening; wherein the opening is in communication with a memory card holder and configured to accept a memory card.

7. A rearview assembly comprising:
a rearview device;
a housing supporting the rearview device and defining at least one vent opening;
a cavity defined by the housing and the rearview device;
a first printed circuit board having a processor and disposed within the cavity;
a second printed circuit board having a first surface and a second surface and in communication with the first printed circuit board and disposed within the cavity;
a memory card holder disposed on the first surface of the second printed circuit board;
at least one rib having an outer edge and extending from the housing into the cavity;
a channel whose sidewalls are defined by a portion of the housing, the at least one rib, and a portion of the second surface of the second printed circuit board opposite the location of the memory card holder, the channel in fluid communication with the at least one vent opening; and
an air moving device disposed within the cavity and configured to draw air from an area exterior to the housing into the cavity;
wherein the air moving device is configured to draw air from an area exterior to the housing through the at least one vent opening and into the channel; and
wherein the channel is configured to allow the memory card holder to be cooled by air moving through the channel on the opposite side of the second printed circuit board from the memory card holder.

8. The rearview assembly of claim 7, wherein the sidewalls of the channel are generally airtight.

9. The rearview assembly of claim 7, further comprising a seal; wherein the seal is disposed between the outer edge of the at least one rib and the second printed circuit board.

10. The rearview assembly of claim 7, further comprising a seal; wherein the seal is disposed between the second printed circuit board and the air moving device.

11. The rearview assembly of claim 7, wherein the processor is in communication with at least one imaging device.

12. The rearview assembly of claim 7, wherein the processor is in communication with at least two imaging devices.

13. The rearview assembly of claim 7, wherein the housing defines at least one vent opening; wherein the at least one vent opening is disposed at one end of and in fluid communication with the channel; and wherein the memory card holder is in proximity to the vent opening.

14. The rearview assembly of claim 7, wherein the housing further defines a memory card opening configured to accept a memory card and in communication with the memory card holder.

15. A rearview assembly comprising:
a rearview device;
a housing supporting the rearview device and defining at least one vent opening;
a cavity defined by the housing and the rearview device;
a first printed circuit board having a processor and disposed within the cavity;
a second printed circuit board having a first surface and a second surface, the second printed circuit board in communication with the first printed circuit board and disposed within the cavity;
a memory card holder disposed on the first surface of the second printed circuit board;
at least one rib having an outer edge and extending from the housing into the cavity;
a channel whose sidewalls are defined by a portion of the housing, the at least one rib, and a portion of the second surface of the second printed circuit board opposite the location of the memory card holder;
an air moving device disposed within the cavity and configured to draw air from an area exterior to the housing through the at least one vent opening and into the channel; and
a seal disposed between the air moving device and the second printed circuit board;
wherein the channel is configured to allow the memory card holder to be cooled by air moving through the channel on the opposite side of the second printed circuit board from the memory card holder; and
wherein the processor is in communication with at least two imaging devices.

16. The rearview assembly of claim 15, wherein at least a portion of the outer edge of the at least one rib is in contact with the second printed circuit board.

17. The rearview assembly of claim 15, further comprising a vent opening defined by the housing and disposed at one end of the channel; wherein the vent opening is configured so that, when air is drawn from an area exterior to the housing into the cavity, the air enters through the vent opening and travels through at least a portion of the channel.

* * * * *